US010831552B1

(12) United States Patent
Manoharan et al.

(10) Patent No.: US 10,831,552 B1
(45) Date of Patent: Nov. 10, 2020

(54) USING MAP-REDUCE TO INCREASE PROCESSING EFFICIENCY OF SMALL FILES

(71) Applicant: Roblox Corporation, San Mateo, CA (US)

(72) Inventors: Aswath Manoharan, Sunnyvale, CA (US); Nikolaus Sonntag, Foster City, CA (US)

(73) Assignee: Roblox Corporation, San Mateo, CA (US)

( * ) Notice: Subject to any disclaimer, the term of this patent is extended or adjusted under 35 U.S.C. 154(b) by 248 days.

(21) Appl. No.: 15/677,780

(22) Filed: Aug. 15, 2017

(51) Int. Cl.
*G06F 16/00* (2019.01)
*G06F 9/50* (2006.01)

(52) U.S. Cl.
CPC ............ *G06F 9/5066* (2013.01); *G06F 16/00* (2019.01)

(58) Field of Classification Search
CPC .... G06F 16/182; G06F 16/10; G06F 16/1844; G06F 16/285; G06F 16/2365; G06F 2201/82; G06F 16/13; G06F 16/2282; G06F 11/1435; G06F 11/1484; G06F 16/164; G06F 16/1865; G06F 16/2255; G06F 16/41; G06F 16/1748; G06F 21/565; G06F 3/0641; G06F 3/065; G06F 9/5061; G06F 16/955; G06F 3/0643; G06F 16/93; G06F 16/951; H04L 61/1582
USPC ............ 707/E17.01, 600, 611, 723; 709/217
See application file for complete search history.

(56) References Cited

U.S. PATENT DOCUMENTS

| | | | | |
|---|---|---|---|---|
| 8,706,745 B1* | 4/2014 | Cooley | ................. | G06F 21/564 707/758 |
| 8,893,096 B1* | 11/2014 | Chen | ........................ | G06F 8/41 717/140 |
| 10,242,052 B2* | 3/2019 | Mandre | ............. | G06F 16/24542 |
| 2007/0244921 A1* | 10/2007 | Blair | ................. | G06Q 10/101 |
| 2008/0114730 A1* | 5/2008 | Larimore | ............ | G06F 16/3325 |
| 2013/0325915 A1* | 12/2013 | Ukai | ..................... | G06F 16/182 707/827 |
| 2013/0332443 A1* | 12/2013 | Opalinski | ............. | G06F 16/951 707/709 |
| 2014/0025713 A1* | 1/2014 | Avati | ..................... | G06F 16/182 707/827 |
| 2014/0351274 A1* | 11/2014 | Agrawal | ................. | G06F 16/93 707/754 |
| 2015/0052214 A1* | 2/2015 | Zhao | ................... | H04L 67/1008 709/211 |

(Continued)

*Primary Examiner* — Tonia L Dollinger
*Assistant Examiner* — Linh T. Nguyen
(74) *Attorney, Agent, or Firm* — Lowenstein Sandler LLP

(57) ABSTRACT

A system and method includes increasing processing efficiency of small files. The method includes generating a file including a plurality of file identifiers that identify a plurality of files in a file system. The method includes causing an execution of a map operation based on the file. The map operation distributes the plurality of file identifiers in a plurality of groups across a plurality of nodes of a computer cluster. The method includes causing an execution of a reduce operation on the plurality of groups of the plurality of file identifiers by the plurality of nodes of the computer cluster. The reduce operation for a first group of the plurality of groups includes reading data of first files of the plurality of files from the file system based on the first group of file identifiers and merging the data of the first files into an output file.

18 Claims, 5 Drawing Sheets

(56) References Cited

U.S. PATENT DOCUMENTS

| | | | |
|---|---|---|---|
| 2015/0355951 A1* | 12/2015 | Cherkasova | G06F 9/5083 |
| | | | 718/104 |
| 2016/0308941 A1* | 10/2016 | Cooley | H04L 29/08 |
| 2016/0366225 A1* | 12/2016 | Jin | G06F 16/214 |
| 2017/0147602 A1* | 5/2017 | Darcy | H04L 63/10 |
| 2017/0214648 A1* | 7/2017 | Shapiro | H04L 51/32 |
| 2017/0344546 A1* | 11/2017 | Nam | G06F 9/48 |

* cited by examiner

USING MAP-REDUCE TO INCREASE PROCESSING EFFICIENCY OF SMALL FILES

TECHNICAL FIELD

This disclosure relates to the field of processing data sets and, in particular, processing files based on a file of file identifiers.

BACKGROUND

Data sets can be processed by nodes of a computer cluster. The processing may include execution of a map operation and a reduce operation that are part of a map-reduce job. The map operation may include filtering and sorting data and the reduce operation may include summary operations on the data. The processing may be performed by a map-reduce framework, such as Hadoop®.

DESCRIPTION OF DRAWINGS

Various implementations of the present disclosure will be understood more fully from the detailed description given below and from the accompanying drawings of various implementations of the disclosure.

DETAILED DESCRIPTION

Figure 1:
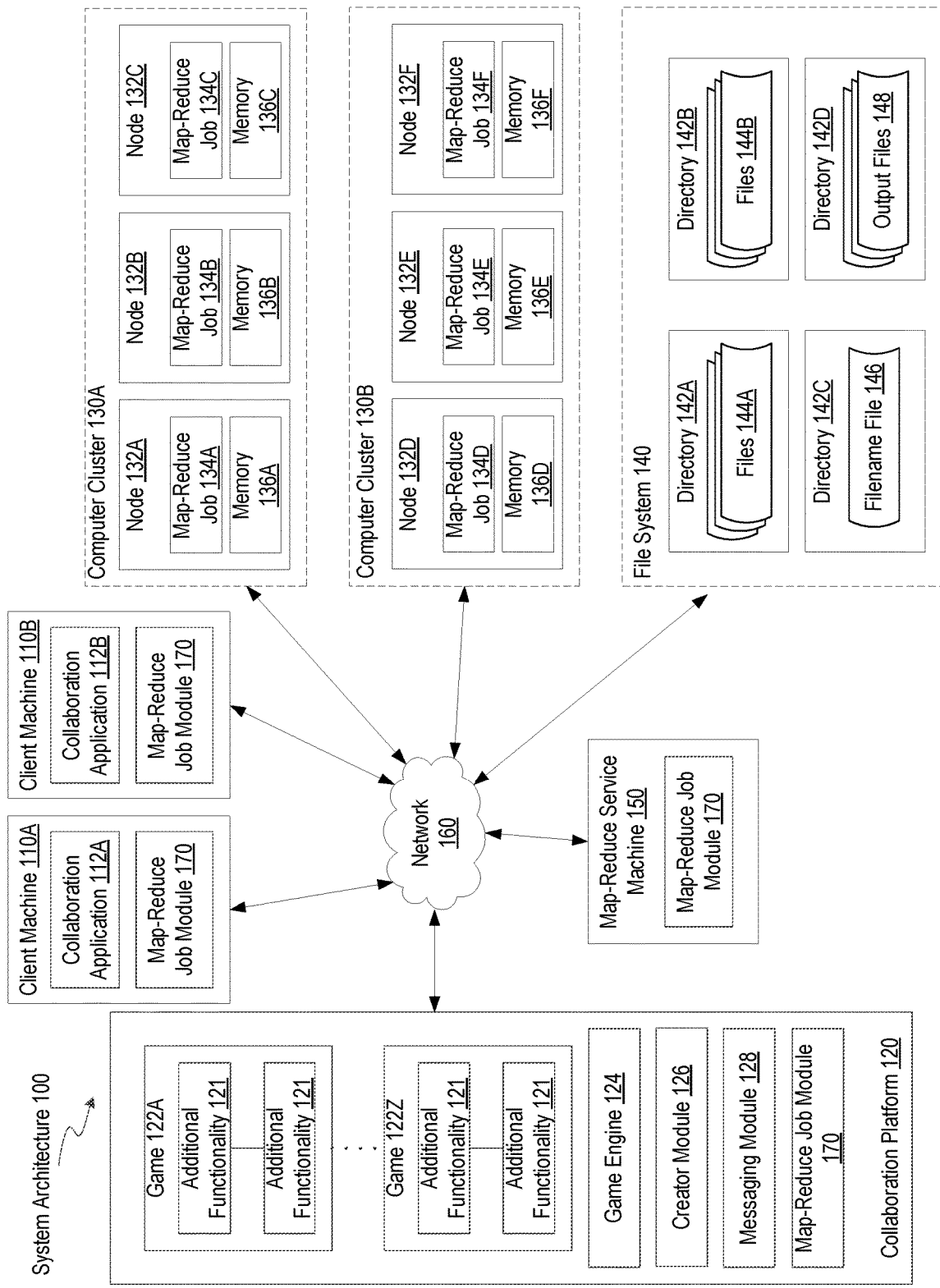
FIG. 1 illustrates an example system architecture, in accordance with some implementations.

Data (e.g., data sets) may be stored in files that are stored in a file system (e.g., a distributed file system). The files in the file system may be processed (e.g., using a map-reduce programming model). Processing of the files is more efficient if parallelized over multiple computing devices instead of being processed by a single computing device. The multiple computing devices may be referred to as a computer cluster and each computing device may be a node of the computer cluster. Files may be processed in parallel by nodes of a computer cluster through a map-reduce programming model that includes execution of a map operation and execution of a reduce operation. In the map operation, nodes of the computer cluster download the files, read the data of the files, and distribute the data across nodes of the computer cluster. In the reduce operation, each of the nodes of the computer cluster that received distributed data in response to the map operation generates output files based on the distributed data.

In the map operation, each node downloads files, reads data from the files, and distributes the data, one file at a time (e.g., a node has processing overhead for each file that it processes). If there are more files than nodes that are performing the map operation, the map operation can be a bottleneck for the processing of the files. Processing a large number of small files (e.g., files less than 128 megabytes in size) causes poor performance such as slow processing times, inability to process a current set of files before receiving a new set of files for processing, interruption of other jobs running on the same computer system, high processing overhead, etc.

Aspects of the present disclosure address the above-mentioned and other challenges by generating output files based on a file of file identifiers, distributing the file identifiers in groups across a plurality of nodes, and for each group of identifiers, reading data of the associated files and merging the data into an output file. In some implementations, the generating of output files may include a map operation that does not include nodes downloading files, reading data from the files, and distributing the data. In some implementations, the map operation may include a node receiving a file of file identifiers (e.g., where the files are small files), reading the file identifiers from the file, and distributing the file identifiers to nodes. The reduce operation may include nodes downloading files corresponding to the file identifiers and generating corresponding output files based on the downloaded files. The output files may include data from multiple files and be significantly larger than the initial input files (e.g., files greater than or equal to 128 megabytes in size). In some implementations, the large output files may be used in a subsequent map-reduce operation, which increases the overall efficiency of data processing. For instance, generating output files based on a file of file identifiers may reduce data processing times, may increase the ability to process a current set of files before receiving a new set of files for processing, etc.

In one implementation, a computer system generates a file including file identifiers that identify files in a file system. A first node of the computer system may execute a map operation based on the file to distribute the file identifiers in groups across nodes of the computer system. The nodes of the computing system may execute a reduce operation on the groups of the file identifiers. The reduce operation for a first group of the groups may include reading data of first files of the files from the file system based on the first group of the file identifiers and merging the data of the first files into an output file.

Generating output files based on a file of file identifiers as disclosed herein is advantageous at least because it provides a faster and more efficient way to process data sets, in particular when the data is spread across multiple small files. In addition, aspects of the present disclosure result in significant reduction of computation (processing) resources because data processing where output files are generated based on a file of file identifiers is more efficient than data processing where performing map-reduce operations includes performing a map operation on multiple small files, for example.

It may be noted that a map operation and a reduce operation described as part of a map-reduce programming model is provided for purposes of illustration, rather than limitation. Distributing data to nodes of a cluster and generating output files, by the nodes, from the distributed data can take place in one or more programming models, such as hash partitioning, self-balancing tree data structure (e.g., B-tree), relational database management system (RDBMS), and so forth.

It may be noted that output files generated from a file of file names are described as being used in a subsequent map-reduce operation for purposes of illustration, rather than limitation. In other implementations, the output files may be used in any number of ways, or other data processing techniques for example.

FIG. 1 illustrates an example system architecture 100, in accordance with one implementation of the disclosure. The system architecture 100 includes client machines 110A and 110B, collaboration platform 120, computer clusters 130A and 130B, file system 140, map-reduce service machine 150, and network 160.

In implementations, the client machines 110A through 110B each include computing devices such as personal computers (PCs), mobile devices (e.g., laptops, mobile phones, smart phones, tablet computers, or netbook computers), network-connected televisions, gaming consoles, etc. In some implementations, client machines 110A through 110B may also be referred to as "user devices."

The client machines 110A-B may host various applications, including, for example, web applications, desktop applications, browser applications, etc. In one implementation, an application is a map-reduce job module 170 (e.g., a map-reduce interface application). The map-reduce job module 170 may allow a user of a client machine 110 to send a map-reduce job 134 to be processed and may receive a result of a map-reduce job 134. The map-reduce job module 170 may allow the client machine to interact with (e.g., submit map-reduce jobs 134 to) map-reduce service machine 150.

In implementations, each client machine 110 may include an instance of collaboration application 112. In one implementation, the collaboration application 112 may be an application that allows users to use and interact with collaboration platform 120, such as control a virtual character in a virtual game hosted by collaboration platform 120, or view or upload content, such as images, video items, web pages, documents, and so forth. In one example, the collaboration application 112 may be a web browser that can access, retrieve, present, or navigate content (e.g., virtual character in a virtual environment, etc.) served by a web server. The collaboration application 112 may render, display, or present the content (e.g., a web page, a media viewer) to a user. In an implementation, the collaboration application 112 may also include an embedded media player (e.g., a Flash® player) that is embedded in a web page. In another example, the collaboration application 112 may be a standalone application (e.g., a mobile application, app, or a gaming program) that allows users to interact with collaboration platform 120. According to aspects of the disclosure, the collaboration application 112 may be an application for users to create, edit, upload content to the collaboration platform 120 as well as interact with collaboration platform 120. As such, the collaboration applications 112 may be provided to the client machines 110A and 110B by the collaboration platform 120. In another example, the collaboration applications 112 may be applications that are downloaded from an application distribution server.

In implementations, a user may log-in to collaboration platform 120 via collaboration application 112. The user may access a user account by providing log-in information (e.g., user name and password) where the user account is associated with one or more characters available to participate in one or more games 122 of collaboration platform 120. Collaboration platform 120 or collaboration application 112 may generate (e.g., gather, process, etc.) data associated with user log-in to the collaboration platform 120 and user log-out of the collaboration platform 120 (e.g., an identifier of the user, time of log-in, time of log-out, etc.). The collaboration platform 120 or collaboration application 112 may store the data in files 144 in file system 140.

In one implementation, the collaboration platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to collaboration platform 120. The collaboration platform 120 may also include a website (e.g., a webpage) or application back-end software that may be used to provide a user with access to content provided by collaboration platform 120.

In implementations, collaboration platform 120 may be a type of social network providing connections between users. In implementations of the disclosure, a "user" may be represented as a single individual. However, other implementations of the disclosure encompass a "user" being an entity controlled by a set of users and/or an automated source. For example, a set of individual users federated as a community in a social network may be considered a "user." In another example, an automated consumer may be an automated ingestion pipeline, such as a game 122 or component of a game 122 of the collaboration platform 120.

In one implementation, collaboration platform 120 may be a gaming platform. For example, the gaming platform may provide single-player or multi-player games to a community of users that may access or interact with the games 122A-122Z using client machines 110. Games 122 (also referred to as "video game," "online game," or "virtual game" herein) may be two-dimensional (2D), three-dimensional (3D) games, virtual reality (VR) games, augmented reality (AR) games, for example. A game 122 can include an electronic file that can be executed or loaded using software, firmware, or hardware configured to present the digital media item to an entity. In one implementation, collaboration platform 120 hosts games 122 and allows users to interact with the games 122 using collaboration application 112 of client machine 110. Users of collaboration platform 120 may play, create, interact with, and build games 122, or create and build content of games 122. For example, users may create characters, decoration for the characters, one or more virtual environments for an interactive game, or build structures in a game, for example. In implementations, users may buy, sell, or trade game items, such as in-platform currency (e.g., virtual currency), with other users of the collaboration platform 120. In implementations, collaboration platform 120 may transmit game content to collaboration applications 112. Game content (also referred to as "content") may refer to any data or software instructions (e.g., in-game items, user information, video, images, commands, etc.) associated with collaboration platform 120 or collaboration applications 112. Collaboration platform 120 may generate (e.g., gather, process, etc.) data associated with users playing, creating, interacting with, building, etc. games 122 and content of games 122 (e.g., identifier of the user, time of beginning interaction, time of ending interaction, updates to a game 122 or game content, time and type of transaction, etc.). The collaboration platform may store the data in files 144 in file system 140.

It may be noted that collaboration platform 120 hosting games 122, is provided for purposes of illustration, rather than limitation. In some implementations, collaboration platform 120 may host one or more media items. Media items can include, but are not limited to, digital video, digital movies, digital photos, digital music, audio content, melodies, website content, social media updates, electronic books (eBooks), electronic magazines, digital newspapers, digital audio books, electronic journals, web blogs, real simple syndication (RSS) feeds, electronic comic books, software applications, etc. In implementations, a media item may be an electronic file that can be executed or loaded using software, firmware or hardware configured to present the digital media item to an entity. Collaboration platform 120 may generate (e.g., gather, process, etc.) data associated with downloading and execution of media items (e.g., identifier of the user, time of download, time of execution, identifier of the media item, etc.). The collaboration platform may store the data in files 144 in file system 140.

In one implementation, collaboration platform 120 may consolidate the game content from the client machines 110 and transmit the consolidated game content (e.g., gaming video, rendering commands, user input, graphics library commands, etc.) to each of the client machines 110 to display interactions of the multiple users in a multi-player gaming environment. In another implementation, collaboration platform 120 may transmit the game content from the one or more client machines 110 to another client machine for the other client machine to consolidate and display the game content. In another implementation, the collaboration platform 120 may receive the game content (e.g., first user transmitting user input via client machine 110A and second user transmitting user input via client machine 110B), generate a game result (e.g., first user beats second user), and transmit the game results to the client machines 110. Collaboration platform 120 may generate (e.g., gather, process, etc.) data associated with user input, rendering commands, graphics library commands, user interactions, game results, etc. The collaboration platform may store the data in files 144 in file system 140.

In some implementations, a game 122 may be associated with a particular user or particular group of users (e.g., a private game), or made widely available to users of the collaboration platform 120 (e.g., a public game). In implementations, where collaboration platform 120 associates one or more games 122 with a specific user or group of users, collaboration platform 120 may associate the specific user(s) with a game 122 using user account information (e.g., a user account identifier such as username and password).

In some implementations, a game 122 may include base functionalities and additional functionalities 121. Users of the collaboration platform 120 may participate in the base functionalities of a game 122 without using the additional functionalities of the game 122. In some implementations, the base functionalities are granted to all (or most) users of collaboration platform 120, and the additional functionalities are granted for a smaller set of users. In some implementations, the additional functionalities 121 may include one or more of messaging functionalities, following functionalities, sharing functionalities, purchasing functionalities, inviting functionalities, etc. Collaboration platform 120 may generate (e.g., gather, process, etc.) data associated with the base functionalities with which a user has engaged and the additional functionalities 121 with which a user has engaged. The collaboration platform may store the data in files 144 in file system 140.

In implementations, collaboration platform 120 may include a creator module 126. In implementations, creator module 126 may allow users to become creators to design or create environments in an existing game 122 or create new games or create new items within games or environments. In some implementations, a game 122 may have a common set of rules or common goal, and the environments of a game 122 share the common set of rules or common goal. In implementations, different games may have different rules or goals from one another. In some implementations, games 122 may have one or more environments where multiple environments may be linked. For example, a user may build a virtual environment that is linked to another virtual environment created by another user. A character of the virtual game may cross the virtual boarder to enter the adjacent virtual environment. In implementations, items may refer to objects that are used, created, shared or otherwise depicted in games 122 of the collaboration platform 120. For example, items may include a character, tools, clothing, buildings, vehicles, currency, and so forth. Collaboration platform 120 may generate (e.g., gather, process, etc.) data associated with design or creation of environments in games 122. The collaboration platform may store the data in files 144 in file system 140.

In implementations, collaboration platform 120 may include messaging module 128. In implementations, messaging module 128 may be a system, application, or module that allows users to exchange electronic messages via a communication system, such as network 160. Messaging module 128 may be associated with collaboration application 112 (e.g., module of collaboration application 112 or be a separate application). In implementations, users may interface with messaging module 128 and exchange electronic messages among users of collaboration platform 120. Messaging module 128 may be, for example, an instant messaging application, a text messaging application, an email application, a voice messaging application, a video messaging application, or a combination of multiple applications, among others.

In implementations, messaging module 128 may facilitate the exchange of electronic messages between users. For example, a user may be logged into a messaging application on client machine 110A, and another user may be logged into a messaging application on client machine 110B. The two users may start a conversation, such as an instant messaging conversation (e.g., via messaging module 128). Messaging module 128 may help facilitate the messaging conversation by sending and receiving the electronic messages between the users of collaboration platform 120.

In implementations, collaboration platform 120 may include map-reduce job module 170. Map-reduce job module 170 will be further described in the subsequent Figures. In implementations, map-reduce service machine 150 or client machines 110 may implement some or all the functionality of map-reduce job module 170.

As discussed herein, collaboration platform 120 may generate (e.g., gather, process, etc.) data associated with user access and interaction with games 122, media items, game content, additional functionalities 121, game engine 124, creator module 126, messaging module 128, etc. The collaboration platform may store the data in files 144 in file system 140. For example, collaboration platform 120 may generate a file 144 that contains data including an identifier for a user, an identifier for a game 122 or media item with which the user is interacting, a start time that the user started interacting with the game 122 or media item, an end time that the user stopped interacting with the game 122 or media item, etc. In one implementation, collaboration platform 120 stores files 144 for one or more games 122 or media items in the same directory 142 of the file system 140. In another implementation, collaboration platform 120 stores files 144 for one or more users in the same directory 142 of the file system 140. In another implementation, collaboration platform 120 stores files 144 for one or more periods of time in the same directory 142 of the file system 140. For example, directory 142A may include files 144A from a first day and directory 142B may contain files 144B from a second day.

In general, functions described in one implementation as being performed by the collaboration platform 120 can also be performed on the client machines 110A through 110B, computer clusters 130, or map-reduce service machine 150, in other implementations if appropriate. In addition, the functionality attributed to a particular component can be performed by different or multiple components operating together. The collaboration platform 120 can also be accessed as a service provided to other systems or devices through appropriate application programming interfaces, and thus is not limited to use in websites.

In implementations, the computer cluster 130 includes a set of interconnected nodes 132 (e.g., computing devices) to perform a common task so that the computer cluster may be viewed as a single computer system. For example, computer cluster 130A includes nodes 132A, 132B, and 132C. Computer cluster 130B includes nodes 132D, 132E, and 132F. Each node of computer clusters 130A-B may include, but is not limited to, any data processing device, such as a desktop computer, a laptop computer, a mainframe computer, a personal digital assistant, a server computer, a hand-held device or any other device configured to process data. The nodes 132 of the computer cluster may be connected to each other through a network, such as network 160, which each node 132 running its own instance of an operating system.

Each node 132 of computer clusters 130A-B may have its own physical or virtual memory. For example, memory 136A, 136B, 136C, 136D, 136E, and 136F correspond to node 132A, 132B, 132C, 132D, 132E, and 132F, respectively. Memory may include, but is not limited to, main memory such as, read-only memory (ROM), flash memory, dynamic random access memory (DRAM) (e.g., synchronous DRAM (SDRAM) or DRAM (RDRAM), etc.), and static memory (e.g., flash memory, static random access memory (SRAM), etc.). It may also be noted that each node of computer clusters 130A-B may have data stored on local storage (not shown), such as local storage disks.

Computer clusters 130A-B, and each node of the aforementioned clusters, can further implement various network-accessible server-based functionality (not shown) or include other data processing equipment.

The computer clusters 130A-B may include a network attached storage file system 140. In one implementation, the file system 140 may be a memory (e.g., random access memory), a cache, a drive (e.g., a hard drive), a flash drive, a database system, or another type of component or device capable of storing data. The file system 140 may include any number of mass storage devices, such as magnetic or optical storage based disks, solid-state drives (SSDs) or hard drives, coupled to computer clusters 130A-B via the network 160. The file system 140 may also include multiple storage components (e.g., multiple drives or multiple databases) that may also span multiple computing devices (e.g., multiple server computers). In implementations, the file system 140 may be a distributed file system. For example, the file system 140 may be a cloud storage service. The file system 140 may include directories 142. Each directory 142 may store files 144 that meet a parameter (e.g., were created during a specific time range, are associated with each other, are etc.). Each directory 142 may store one or more of files 144, a filename file 146, or output files 148.

In implementations, computer clusters 130 may organize data in file system 140. For example, file system 140 may store data on directories 142A-D. Data in file system 140 may be located in files 144A-B, filename file 146, and output files 148 and organized using volumes. A volume is a single accessible storage area of file system 140, which may be resident on a single partition of a hard disk of the file system 140. A volume may be a representation of a logical location, rather than a physical location, of a storage area in file system 140. For example, physical hard disk-1 may have two partitions, partition-1 and partition-2. A volume label "C:" may be assigned to partition-1 and a volume label "D:" may be assigned to partition-2. Hard disk-1 is a physical disk and "C:" and "D:" are volumes representing logical locations on physical hard disk-1.

In implementations, the file system 140 may store data as files 144A-B and may include directories 142A-D, also referred to as folders, which are virtual containers within the file system 140, in which groups of computer files 144A-B and possibly other directories may be kept and organized. Related files 144A-B may be stored in the same directory. A sub-directory, also referred to as a sub-folder, is a directory contained inside another directory. The top-most directory is referred to as a root or top-level directory within the file system 140. Together, the directories form a hierarchy or tree structure of one or more levels in the file system 140.

In implementations, the file system 140 receives data from collaboration platform 120 and stores the data in files 144 in directories 142 of file system 140. In implementations, the file system 140 receives files 144 from collaboration platform 120 and stores the files 144 in directories 142 of the file system 140.

In implementations, the map-reduce service machine 150 may be one or more computing devices (e.g., a rackmount server, a server computer, a controller device, etc.). Map-reduce service machine 150 may include, but is not limited to, any data processing device, such as a desktop computer, a laptop computer, a mainframe computer, a personal digital assistant, a server computer, a hand-held device or any other device configured to process data. The map-reduce service machine 150 may be included in the collaboration platform 120, be an independent system or be part of another system or platform.

The client machines 110A-B, collaboration platform 120, computer clusters 130A-B, file system 140, and map-reduce service machine 150 may be coupled via network 160 that communicates any of the standard protocols for the exchange of information. Some or all of client machines 110A-B, collaboration platform 120, computer clusters 130A-B, file system 140, and map-reduce service machine 150 may run on a Local Area Network (LAN) and may be incorporated into the same physical or logical system, or different physical or logical systems. Alternatively, some or all of client machines 110A-B, collaboration platform 120, computer clusters 130A-B, file system 140, and map-reduce service machine 150 may reside on different LANs that may be coupled together via the Internet but separated by firewalls, routers, and/or other network devices. In yet another configuration, some or all of client machines 110A-B, collaboration platform 120, computer clusters 130A-B, file system 140, and map-reduce service machine 150 may reside on a server, or different servers, coupled to other devices via a public network (e.g., the Internet) or a private network (e.g., LAN). In implementations, a communication session is established, over network 160, between two or more of client machine 110, map-reduce service machine 150, collaboration platform 120, and the file system 140.

The network 160 may be a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, or a combination thereof. Network 160 may include a wireless infrastructure. The wireless infrastructure may be provided by one or multiple wireless communications systems, such as a wireless fidelity (Wi-Fi®) hotspot connected with the network 160 and/or a wireless carrier system that may be implemented using various data processing equipment, communication towers, etc. It may be noted that various other network configurations may be used including, for example, hosted configurations, distributed configurations, centralized configurations, etc. It also may be noted that each node of a computer cluster may be connected to another node of the same cluster or to other nodes of different clusters via network 160 in the same manner as described above.

Map-reduce service machine 150 may contain map-reduce job module 170. Map-reduce job module 170 may receive one or more map-reduce jobs 134 from the client machines 110A-B (e.g., a client machine 110 may submit a map-reduce job 134 that is received by the map-reduce service machine 150). Map-reduce job module 170 may generate a filename file 146 including file identifiers (e.g., filenames) that identify files 144 in a file system 140 (e.g., in one or more directories 142 of file system 140) corresponding to a map-reduce job 134.

In implementations, map-reduce job module 170 may select one or more computer clusters 130 on which each map-reduce job 134 is to be executed, based on one or more cluster selection rules. Cluster selection rules may include the load on a cluster 130 or a node 132 of a cluster 130, the availability of a cluster 130 or a node 132 of a cluster 130, the location of the data (e.g., files 144, filename file 146, output files 148), or a characteristic of the cluster 130 or a node 132 of the cluster 130, among other rules.

In implementations, the map-reduce job module 170 may cause the selected one or more clusters 130 to execute a map-reduce job 134 (e.g., map-reduce job module 170 may send map-reduce job 134 to the selected one or more clusters). In implementations, the map-reduce job module 170 may cause an execution of a map operation based on the filename file 146. The map operation distributes the file identifiers from the filename file 146 in groups across nodes 132 of a computer cluster 130. The map-reduce job module 170 causes an execution of a reduce operation on the groups of the file identifiers by the nodes 132 of the computer cluster 130. The reduce operation for a first group includes reading data of first files from the file system 140 based on the first group of file identifiers and merging the data of the first files into an output file 148.

In implementations, once the map-reduce job 134 is sent to the one or more clusters 130, the map-reduce job module 170 may monitor the progress of the map-reduce job 134 being executed on the selected clusters 130 and may determine, based on the above described cluster selection rules, that the map-reduce job 134 may be migrated to a different cluster 130.

In implementations, map-reduce service machine 150 may receive a result of the map-reduce job 134 (e.g., output files 148, second output files 330) and may store the result in the file system 140 (e.g., in directory 142D).

In implementations, each node of computer clusters 130A-B may execute all or part of a map-reduce job 134 received from the map-reduce service machine 150. The execution of all or part of one or more map-reduce jobs is illustrated by map-reduce job 134A, 134B, 134C, 134D, 134E, and 134F running on their respective nodes. It may be noted that a single map-reduce job may run on one or more nodes of one or more clusters in parallel. Each node 132 may have memory 136 (e.g., memory hardware) and may also communicate with the file system 140 or local storage (not shown).

In implementations, each computer cluster, such as computer clusters 130A-B, may run the same or different map-reduce frameworks. Each node 132 of each cluster 130 is configured to run a specific map-reduce framework. Different frameworks include frameworks such as, Apache™ Hadoop®, Hazelcast®, MongoDB®, Infinispan, and Apache™ Spark™.

In implementations, map-reduce service machine 150 receives map-reduce jobs 134 submitted by client machines 110A-D. Map-reduce service machine 150 may also receive information from computer clusters 130A-B and file system 140. The information may include an interim (e.g., output files 148) and final result (e.g., second output files 330) of the map-reduce job 134.

It may be noted that a map-reduce job 134 may include multiple functions. It may be noted that a map-reduce job 134 may describe a complete execution of the functions and may include an initial input and final output. Alternatively, a map-reduce job 134 may indicate one or more functions or operations in executing a map-reduce job 134. For example, a map-reduce job 134 may refer to the map function or the reduce function.

For the sake of illustration, map-reduce job module 170 is implemented on map-reduce service machine 150. In other implementations, map-reduce job module 170 may in part or wholly be implemented on client machine 110. In other implementations, map-reduce job module 170 may in part or wholly be implemented on collaboration platform 120. In other implementations, map-reduce job module 170 may operate on one or more of client machines 110, map-reduce service machine 150, or collaboration platform 120 and may work in conjunction to perform the operations described herein.

Although implementations of the disclosure are discussed in terms of collaboration platforms, implementations may also be generally applied to any type of system or platform implementing data processing.

In situations in which the systems discussed herein collect personal information about users, or may make use of personal information, the users may be provided with an opportunity to control whether the collaboration platform 120 collects user information (e.g., information about a user's social network, social actions or activities, profession, a user's preferences, or a user's current location, etc.), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the collaboration platform 120.

Figure 2:
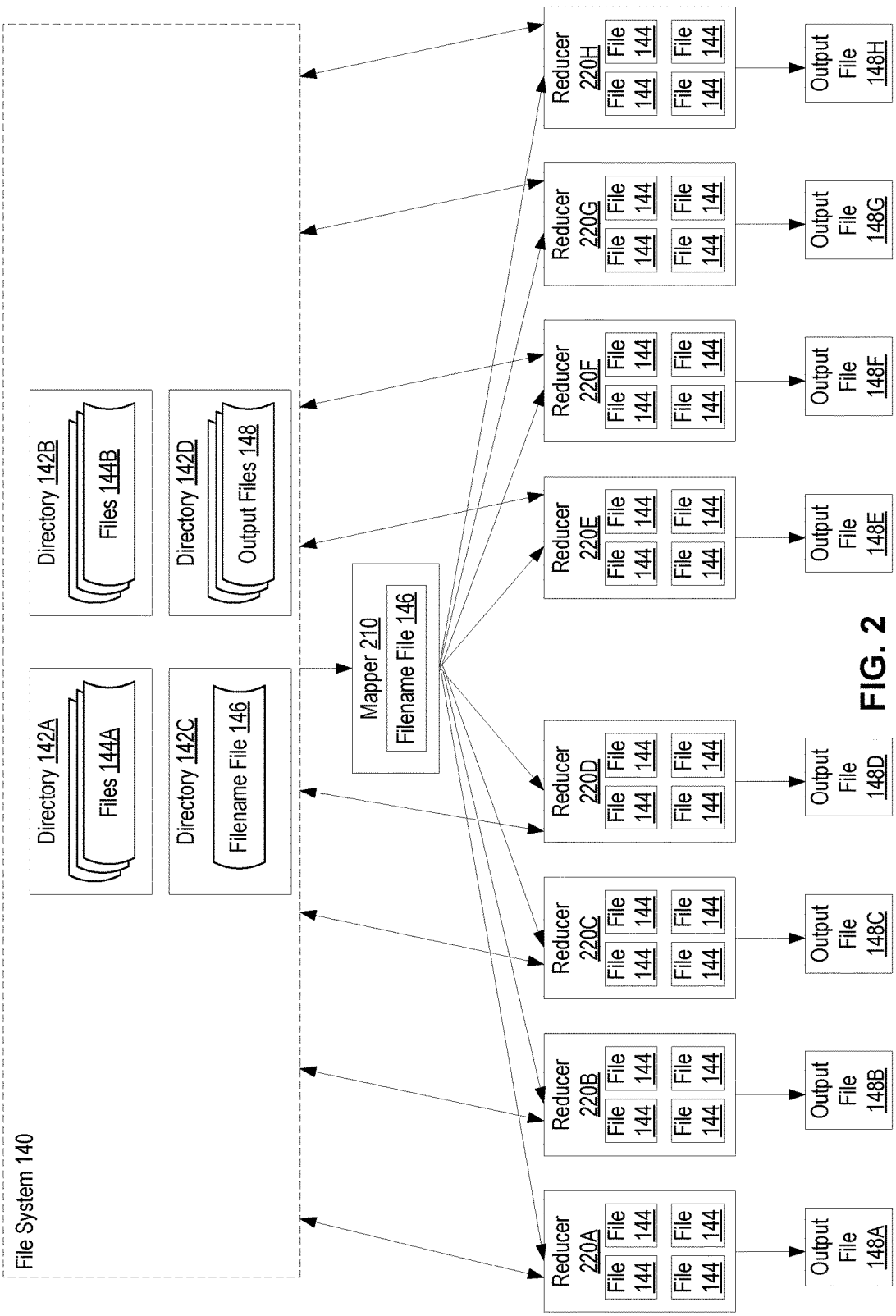
FIG. 2 is a block diagram illustrating generating output files based on a file of file identifiers, in accordance with some implementations.

FIG. 2 is a block diagram illustrating generating output files 148 based on a file of file identifiers (e.g., filename file 146), in accordance with some implementations.

As described herein, file system 140 may include directories 142 and files stored in the directories. For example, files 144A may be stored in directory 142A of file system 140 and files 144B may be stored in directory 142B of file system 140. Each directory 142 may be associated with a corresponding parameter. For example, directory 142A may be associated with files received over a first period of time (e.g., on a first day) and directory 142B may be associated with files received over a second period of time (e.g., on a second day).

In implementations, map-reduce job module 170 (e.g., of map-reduce service machine 150, of client machine 110, of collaboration platform 120, etc.) may receive an identifier identifying one or more directories 142 of the file system 140. For example, map-reduce job module 170 may receive a parameter of a first period of time that is associated with (e.g., identifies) directory 142A of the file system 140. Map-reduce job module 170 may identify file identifiers (e.g., filenames) associated with files 144 located in the one or more directories 142 based on the identifier. For example, map-reduce job module 170 may identify the filenames of the files 144A located in the directory 142A of the file system 140 based on the parameter of a first period of time. The map-reduce job module 170 may generate a file (e.g., filename file 146) including the file identifiers that identify the files 144 in the file system 140. The map-reduce job module 170 may store the filename file 146 in the file system 140 (e.g., in directory 142C). In implementations, the parameter may be supplied by an administrator as part of a map-reduce job.

In some implementations, generating filename file 146 may include identifying files that are equal to or less than a threshold size (e.g., 128 megabytes). In implementations, the file identifiers of the identified files may be included in the filename file 146, while the file identifiers for files larger than a threshold size are not included.

In implementations, the map-reduce job module 170 may select one or more computer clusters 130 for execution of a map-reduce job 134. A first node 132 of the computer clusters 130 may be used to execute a first map operation and may be referred to as mapper 210. Multiple nodes 132 of the computer clusters 130 may be used to execute the first reduce operation and may be referred to as reducers 220. For example, the map-reduce job module 170 may select computer cluster 130A for execution of the map-reduce job 134. Node 132A may be referred to as mapper 210 (e.g., may execute the first map operation) and nodes 132A-C may be referred to as reducers 220 (e.g., may execute the first reduce operation).

The map-reduce job module 170 may cause the mapper 210 to access the filename file 146 (e.g., transmit the filename file 146 to the computer cluster 130, transmit the filename file 146 to the mapper 210, cause the mapper 210 to retrieve the filename file 146 from the file system 140, etc.). The map-reduce job module 170 may cause the mapper 210 to execute the first map operation based on the filename file 146. The mapper 210 may receive (e.g., download from the file system 140) the filename file 146, read the data (e.g., identifiers associated with files 144 located in a directory 142 of the file system 140, filenames) of the filename file 146, and distribute the data of the filename file 146 to the reducers 220. It may be noted that in implementations, the filename file 146 may not include any data of the files identified by the file identifiers other than the file identifiers themselves. The mapper may distribute the file identifiers in groups across nodes 132 (e.g., reducers 220) of a computer cluster 130.

In implementations, each reducer 220 receives a corresponding group of file identifiers in response to the map operation. In implementations, the map-reduce job module 170 may cause the reducers 220 to execute a first reduce operation on the groups of file identifiers (e.g., each reducer 220 reads corresponding files 144 from the file system 140 and writes a corresponding output file 148 without performing additional operations on the files 144). In implementations, the first reduce operation includes each reducer 220 reading data of corresponding files 144 from the file system 140 based on the corresponding group of file identifiers (e.g., downloading the files 144 corresponding to the filenames received from the map operation). In implementations, the first reduce operation may further include each reducer 220 merging the data of the corresponding files 144 into a corresponding output file 148 (e.g., without performing additional operations on the data of the files 144). In implementations, the output files 148 may be stored in a directory 142 of the file system 140 (e.g., reducers 220 may store output files 148 in directory 142D of file system 140).

In implementations, by the mapper 210 executing the map operation on filename file 146 and the reducers 220 downloading the files 144 from the file system, the bottleneck effect of a subsequent map operation may be removed or reduced. Rather than having multiple mappers download small files from the file system, reading data from the files, and distributing the data, the filename file 146 may be used to compress small files into larger output files 148, on which a more efficient map-reduce operation may be performed.

Figure 3:
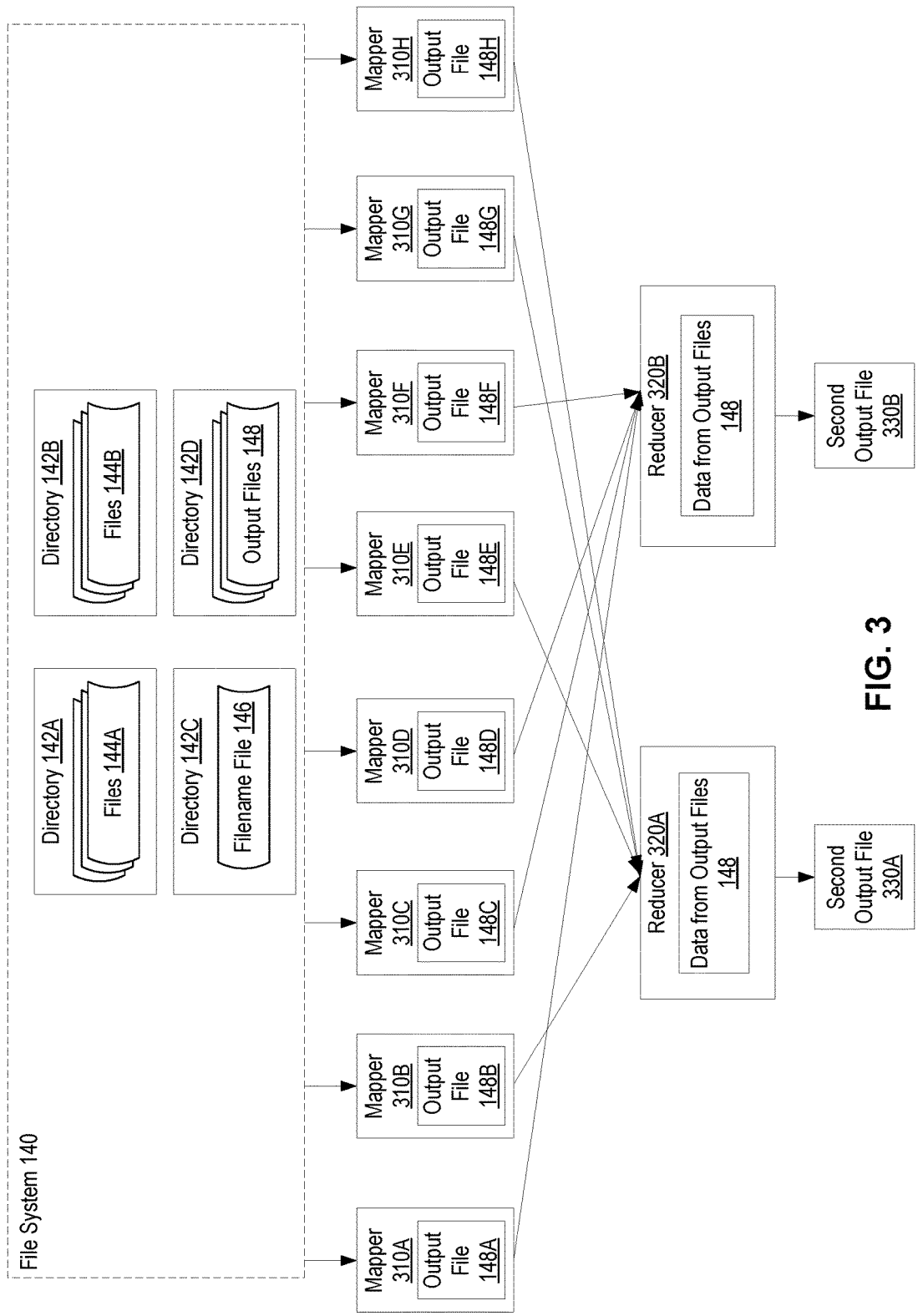
FIG. 3 is a block diagram illustrating using output files that were generated based on a file of file identifiers, in accordance with some implementations.

FIG. 3 is a block diagram illustrating using output files 148 generated based on a file of file identifiers (e.g., filename file 146), in accordance with some implementations.

In implementations, the output files 148 may be generated and stored in directory 142D of file system 140 in response to the first map operation and the first reduce operation illustrated in FIG. 2. Multiple nodes of the computer clusters 130 may be referred to as mappers 310 and multiple nodes of the computer clusters 130 may be referred to as reducers 320. In implementations, one or more of the mapper 210, reducers 220, mappers 310, and reducers 320 correspond to the same node. For example, a computer cluster 130 may include at least eight nodes 132. A first node may be used as the mapper 210, reducer 220A, mapper 310A, and reducer 320A. A second node of the computer cluster 130 may be used as the reducer 220B, mapper 310B, and reducer 320B. A third node of the computer cluster 130 may be used as the reducer 220C and mapper 310C.

In implementations, the map-reduce job module 170 may cause the mappers 310 to access the output files 148 (e.g., transmit the output files 148 to the computer cluster 130, transmit the output files 148 to the mappers 310, cause the mapper 310 to retrieve the output files 148 from the file system 140, etc.). The map-reduce job module 170 may cause the mappers 310 to execute the second map operation based on the output files 148. The mappers 310 may receive (e.g., download from the file system 140) the output files 148, read the data of the output files 148, and distribute the data of the output files 148 to the reducers 220.

In implementations, each reducer 320 receives corresponding data from output files 148 in response to the map operation. The map-reduce job module 170 may cause the reducers 220 to execute a second reduce operation on data from output files 148. The second reduce operation includes each reducer 320 merging the data from the output files 148 into a corresponding second output file 330. The second output files 330 may be stored in a directory 142 of the file system 140 (e.g., reducers 220 may store second output files 330 in a directory 142 of file system 140).

In implementations, executing the second map operation and second reduce operation based on the output files 148 (e.g., fewer amount of files and larger files) is more efficient and less time consuming than executing a single map operation and reduce operation based on the files 144 (e.g., larger amount of files and smaller files). For example, it may take a tenth of the time to execute a map-reduce job 134 on a one hundred files than on one million files (e.g., even if the total amount of data is the same for the one hundred files as for the one million files, the one hundred files are a smaller amount of files of a larger size than the one million files of a smaller size).

In one implementation, the first map operation (FIG. 2), the first reduce operation (FIG. 2), the second map operation (FIG. 3), and the second reduce operation (FIG. 3) are part of one map-reduce job 134. For instance, map-reduce job 134 may specify that a first map-reduce operation be performed on filename file 146 and a second map-reduce operation be performed on output file 148. In another implementation, the first map operation and the first reduce operation (FIG. 2) are part of a first map-reduce job and the second map operation and the second reduce operation (FIG. 3) are part of a second map-reduce job 134.

Figure 4:
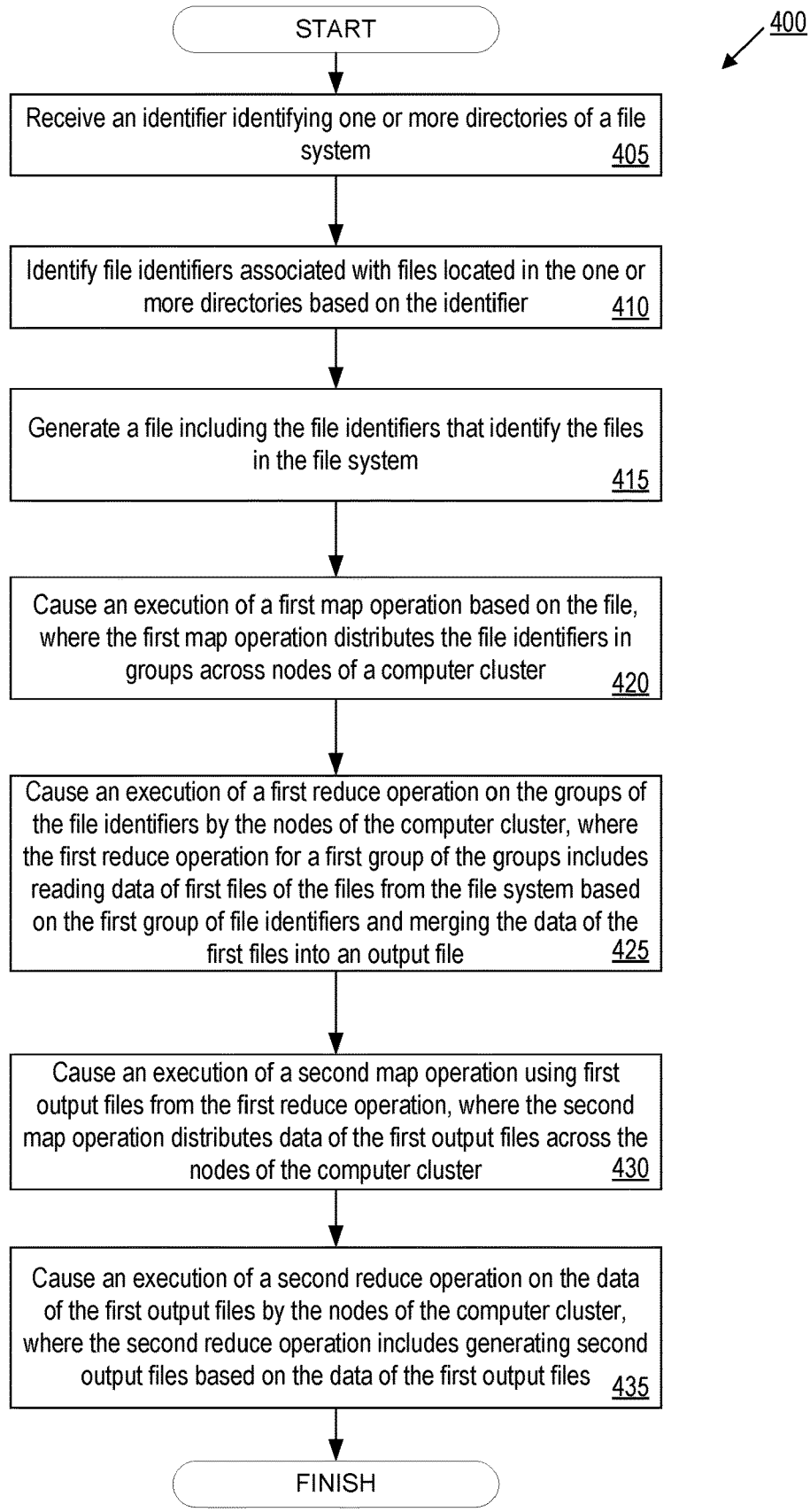
FIG. 4 is a flow diagram illustrating a method for generating output files based on a file of file identifiers, in accordance with some implementations.

FIG. 4 is a flow diagram illustrating method 400 for generating output files 148 based on a file of file identifiers (e.g., filename file 146), in accordance with some implementations. Method 400 may be performed by processing logic that includes hardware (e.g., circuitry, dedicated logic, programmable logic, microcode), software (e.g., instructions run on a processing device to perform hardware simulation), or a combination thereof. In one implementation, map-reduce job module 170 may perform some or all the operations described herein. In some implementations, map-reduce job module 170 executing at the collaboration platform 120, map-reduce service machine 150, client machine 110, or combination thereof may perform some or all the operations. It may be noted that components of FIGS. 1-3 may be used to help illustrate FIG. 4. It may be further noted that in some implementations, the same, additional, or fewer operations may be performed in the same or different order as described with respect to FIG. 4.

Method 400 begins at block 405 where processing logic receives an identifier identifying one or more directories 142 of a file system 140. For example, a user may enter a parameter (e.g., a time interval, one or more games or media items, one or more directories, etc.) via a graphical user interface (GUI) of a client machine 110 and the processing logic (e.g., map-reduce job module 170) may determine one or more directories 142 that correspond to the parameter. The processing logic may identify the files 144 in the one or more directories 142 that correspond to the received identifier. In implementations, receiving the identifier is in response to a user providing a map-reduce job 134 (e.g., via a GUI of a client machine 110). The map-reduce job 134 may identify the one or more directories 142 of the file system 140. In one implementation, map-reduce job 134 may identify the first map operation, the first reduce operation, the second map operation, and the second reduce operation. In another implementation, a first map-reduce job identifies the first map operation and the first reduce operation and a second map-reduce job identifies the second map operation and the second reduce operation.

At block 410, the processing logic may identify file identifiers associated with files 144 located in the one or more directories 142 based on the identifier. In implementations, the file identifiers may be the filenames of the files 144 located in the directories 142 that correspond to the received identifier. In some implementations, file identifiers to be included in a filename file may be further based on file size, as described above.

At block 415, the processing logic may generate a file including the file identifiers that identify the files 144 in the file system 140. In implementations, the file may be a filename file 146. The processing logic may store the file (e.g., filename file 146) in a directory (e.g., directory 142C) on the file system 140.

At block 420, the processing logic may cause an execution of a first map operation based on the file (e.g., filename file 146). The first map operation may distribute the file identifiers in groups across nodes 132 of a computer cluster 130. The processing logic may cause the execution of the first map operation on a first node 132 (e.g., mapper 210) of the computer cluster 130. The first node 132 may download the filename file 146, read the file identifiers from the filename file 146, and distribute the file identifiers across multiple nodes 132 (e.g., reducers 220) of the computer cluster 130.

At block 425, the processing logic may cause an execution of a first reduce operation on the groups of the file identifiers by the nodes 132 of the computer cluster 130. The first reduce operation for a first group of the groups includes reading data of first files of the files 144 from the file system 140 based on the first group of file identifiers and merging the data of the first files into an output file 148. The processing logic may cause execution of the first reduce operation on multiple nodes 132 of the computer cluster 130. Each of the nodes 132 may receive a corresponding group of file identifiers (e.g., filenames) as a result of the first map operation, download the files identified by the corresponding group of file identifiers from the file system 140, merge the files downloaded from the file system 140, and generate an output file 148. Each of the nodes 132 (e.g., reducers 220) executing the first reduce operation may generate a corresponding output file 148 (e.g., one output file 148 per reducer 220). Each reducer 220 may store the corresponding output file 148 in the file system 140.

At block 430, the processing logic may cause an execution of a second map operation using output files 148 from the first reduce operation. The second map operation distributes data of the output files 148 across the nodes 132 of the computer cluster 130. In the second map operation, each of the nodes 132 (e.g., mappers 310) may download an output file 148 from the file system 140, read the data from the output file 148, and distribute the data from the output file 148 across nodes 132 (e.g., reducers 320) of the computer cluster 130. In one implementation, there are as many mappers 310 as there are output files 148. In another implementation, there are more output files 148 than there are mappers 310. There are less output files 148 than the files 144 in the directories 142 identified by the identifier in block 405.

At block 435, the processing logic may cause an execution of a second reduce operation on the data of the first output files by the nodes 132 of the computer cluster 130. The second reduce operation includes generating second output files based on the data of the first output files 148. Each of the nodes 132 (e.g., reducers 320) may receive corresponding distributed data in response to the second map operation, merge the corresponding distributed data, and generate a second output file 330. The reducers 320 may store the second output files 330 in the file system 140.

In one implementation, the execution of the first map operation, first reduce operation, second map operation, and second reduce operation is in response to the processing logic causing the one or more computer clusters 130 to execute a map-reduce job 134 based on the filename file 146. In another implementation, the execution of first map operation and first reduce operation is in response to the processing logic causing the one or more computer clusters 130 to execute a first map-reduce job based on the filename file 146 and the execution of second map operation and second reduce operation is in response to the processing logic causing the one or more computer clusters 130 to execute a second map-reduce job based on the output files 148. The second map-reduce job may be received via a GUI of a client machine 110 prior to, during, or after execution of the first map-reduce job.

Figure 5:
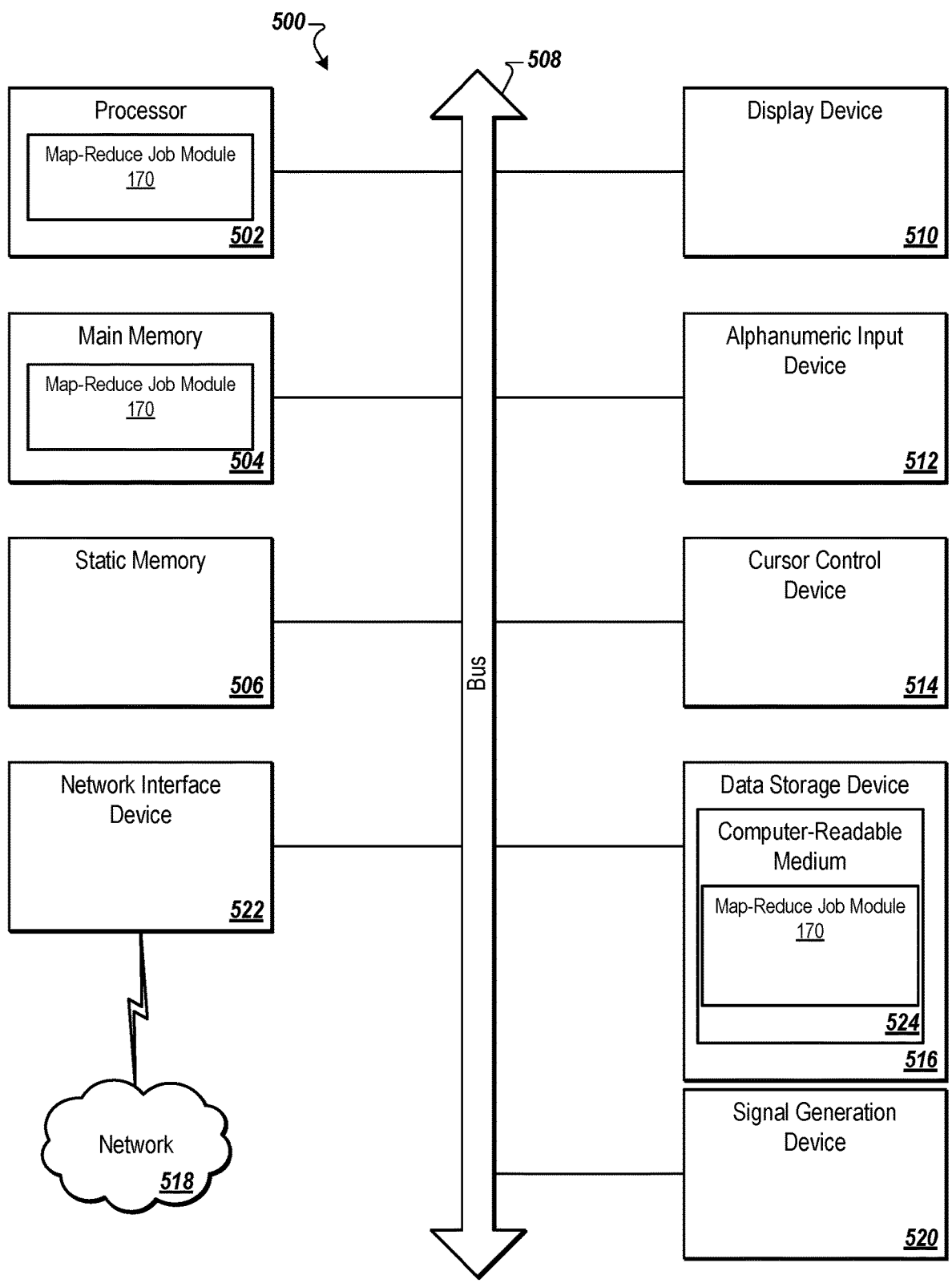
FIG. 5 is a block diagram illustrating an exemplary computer system, according to some implementations.

FIG. 5 is a block diagram illustrating an exemplary computer system 500, according to some implementations. The computer system 500 executes one or more sets of instructions that cause the machine to perform any one or more of the methodologies discussed herein. Set of instructions, instructions, and the like may refer to instructions that, when executed computer system 500, cause computer system 500 to perform one or more operations of map-reduce job module 170. The machine may operate in the capacity of a server or a client machine in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 516, which communicate with each other via a bus 508.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute instructions of the system architecture 100 and the map-reduce job module 170 for performing the operations discussed herein.

The computer system 500 may further include a network interface device 522 that provides communication with other machines over a network 518 (e.g., network 160), such as a local area network (LAN), an intranet, an extranet, or the Internet. The computer system 500 also may include a display device 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a non-transitory computer-readable storage medium 524 (e.g., non-transitory machine-readable storage medium) on which is stored the sets of instructions of the system architecture 100 and map-reduce job module 170 embodying any one or more of the methodologies or functions described herein. The sets of instructions of the system architecture 100 and map-reduce job module 170 may also reside, completely or at least partially, within the main memory 504 and/or within the processing device 502 during execution thereof by the computer system 500, the main memory 504 and the processing device 502 also constituting computer-readable storage media. The sets of instructions may further be transmitted or received over the network 518 via the network interface device 522.

While the example of the computer-readable storage medium 524 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is noted that throughout the description, discussions utilizing terms such as "generating," "causing," "receiving," "identifying," "executing," or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure may, therefore, be determined with reference to the appended claims, along with the full scope of equivalents to which such claims are entitled.

What is claimed is:

1. A method comprising:
identifying, by a processing device, a plurality of files in a file system that are to be merged into a first plurality of output files, wherein the plurality of files are transferred from a collaboration platform to the file system over a network via a communication session established between the collaboration platform and the file system;
generating, by the processing device, a file comprising a plurality of file identifiers that identify the plurality of files in the file system;
directing, by the processing device, an execution of a map operation based on the file, wherein the map operation to transmit the plurality of file identifiers as a plurality of groups of file identifiers to a plurality of nodes of a computer cluster, wherein each of the plurality of nodes is to receive a corresponding group of file identifiers of the plurality of groups of file identifiers, wherein to transmit the plurality of file identifiers as the plurality of groups of file identifiers, the map operation is to transmit a first group of file identifiers corresponding to a first subset of the plurality of file identifiers to a first node of the plurality of nodes and a second group of file identifiers corresponding to a second subset of the plurality of file identifiers to a second node of the plurality of nodes, and wherein the first subset is different from the second subset; and
directing, by the processing device, an execution of a reduce operation on the plurality of groups of file identifiers by the plurality of nodes of the computer cluster, wherein the reduce operation for the first group of file identifiers of the plurality of groups of file identifiers to read data of first files of the plurality of files from the file system based on the first group of file identifiers and to merge the data of the first files into a first output file of the first plurality of output files.

2. The method of claim 1, further comprising:
receiving an identifier identifying one or more directories of the file system; and
identifying the plurality of file identifiers associated with the plurality of files located in the one or more directories based on the identifier.

3. The method of claim 2, wherein:
the map operation is a first map operation and the reduce operation is a first reduce operation, the method further comprising:
subsequent to directing the execution of the first reduce operation, directing an execution of a second map operation using the first plurality of output files from the first reduce operation, wherein the second map operation to transmit data of the first plurality of output files to the plurality of nodes of the computer cluster; and
directing an execution of a second reduce operation on the data of the first plurality of output files by the plurality of nodes of the computer cluster, wherein the second reduce operation to generate a second plurality of output files based on the data of the first plurality of output files.

4. The method of claim 3, wherein the identifier is associated with a map-reduce job, and wherein the first map operation, the first reduce operation, the second map operation, and the second reduce operation are part of the map-reduce job.

5. The method of claim 1, wherein the reduce operation for the first group of file identifiers to retrieve, by the first node of the plurality of nodes, the first files of the plurality of files from the file system that correspond to the first group of file identifiers of the plurality of file identifiers.

6. The method of claim 1, wherein the reduce operation for the first group of file identifiers to merge, for the first node of the plurality of nodes, the data of the first files of the plurality of files without performing operations on the data of the first files.

7. A non-transitory machine-readable storage medium storing instructions that, when executed cause a processing device to perform operations comprising:
identifying a plurality of files in a file system that are to be merged into a first plurality of output files, wherein the plurality of files are transferred from a collaboration platform to the file system over a network via a communication session established between the collaboration platform and the file system;
generating a file comprising a plurality of file identifiers that identify the plurality of files in the file system;
directing an execution of a map operation based on the file, wherein the map operation to transmit the plurality of file identifiers as a plurality of groups of file identifiers to a plurality of nodes of a computer cluster, wherein each of the plurality of nodes is to receive a corresponding group of file identifiers of the plurality of groups of file identifiers, and wherein to transmit the plurality of file identifiers as the plurality of groups of file identifiers, the map operation is to transmit a first group of file identifiers corresponding to a first subset of the plurality of file identifiers to a first node of the plurality of nodes and a second group of file identifiers corresponding to a second subset of the plurality of file identifiers to a second node of the plurality of nodes; and directing an execution of a reduce operation on the plurality of groups of file identifiers by the plurality of nodes of the computer cluster, wherein the reduce operation for the first group of file identifiers of the plurality of groups of file identifiers to read data of first files of the plurality of files from the file system based on the first group of file identifiers and to merge the data of the first files into a first output file of the first plurality of output files.

8. The non-transitory machine-readable storage medium of claim 7, wherein the processing device is to perform further operations comprising:

receiving an identifier identifying one or more directories of the file system; and identifying the plurality of file identifiers associated with the plurality of files located in the one or more directories based on the identifier.

9. The non-transitory machine-readable storage medium of claim 8, wherein the map operation is a first map operation and the reduce operation is a first reduce operation, wherein the processing device is to perform further operations comprising:

subsequent to directing the execution of the first reduce operation, directing an execution of a second map operation using the first plurality of output files from the first reduce operation, wherein the second map operation to transmit data of the first plurality of output files to the plurality of nodes of the computer cluster; and directing an execution of a second reduce operation on the data of the first plurality of output files by the plurality of nodes of the computer cluster, wherein the second reduce operation to generate a second plurality of output files based on the data of the first plurality of output files.

10. The non-transitory machine-readable storage medium of claim 9, wherein the identifier is associated with a map-reduce job, and wherein the first map operation, the first reduce operation, the second map operation, and the second reduce operation are part of the map-reduce job.

11. The non-transitory machine-readable storage medium of claim 7, wherein the reduce operation for the first group of file identifiers to retrieve, by the first node of the plurality of nodes, the first files of the plurality of files from the file system that correspond to the first group of file identifiers of the plurality of file identifiers.

12. The non-transitory machine-readable storage medium of claim 7, wherein the reduce operation for the first group of file identifiers to merge, for the first node of the plurality of nodes, the data of the first files of the plurality of files without performing operations on the data of the first files.

13. A system comprising:

a file system; and a computer system, coupled to the file system, to identify a plurality of files in the file system that are to be merged into a first plurality of output files and to generate a file comprising a plurality of file identifiers that identify the plurality of files in the file system, wherein the plurality of files are transferred from a collaboration platform to the file system over a network via a communication session established between the collaboration platform and the file system, the computer system comprising:

a first map node to execute a map operation based on the generated file, wherein the map operation transmits the plurality of file identifiers as a plurality of groups of file identifiers to a plurality of reduce nodes of the computer system, wherein each of the plurality of reduce nodes is to receive a corresponding group of file identifiers of the plurality of groups of file identifiers, and wherein to transmit the plurality of file identifiers as the plurality of groups of file identifiers, the map operation is to transmit a first group of file identifiers corresponding to a first subset of the plurality of file identifiers to a first reduce node of the plurality of reduce nodes and a second group of file identifiers corresponding to a second subset of the plurality of file identifiers to a second reduce node of the plurality of reduce nodes; and the plurality of reduce nodes to execute a reduce operation on the plurality of groups of file identifiers, wherein the reduce operation for the first group of file identifiers of the plurality of groups of file identifiers comprises reading data of first files of the plurality of files from the file system based on the first group of file identifiers and merging the data of the first files into a first output file of the first plurality of output files.

14. The system of claim 13, wherein the computer system is further to:

receive an identifier identifying one or more directories of the file system; and identify the plurality of file identifiers associated with the plurality of files located in the one or more directories based on the identifier.

15. The system of claim 14, wherein the map operation is a first map operation and the reduce operation is a first reduce operation, wherein:

a plurality of map nodes is further to, subsequent to the plurality of reduce nodes executing the first reduce operation, execute a second map operation using the first plurality of output files from the first reduce operation, wherein the second map operation transmits data of the first plurality of output files to the plurality of reduce nodes; and the plurality of reduce nodes is to execute a second reduce operation on the data of the first plurality of output files, wherein the second reduce operation generates a second plurality of output files based on the data of the first plurality of output files.

16. The system of claim 15, wherein the identifier is associated with a map-reduce job, and wherein the first map operation, the first reduce operation, the second map operation, and the second reduce operation are part of the map-reduce job.

17. The system of claim 13, wherein the reduce operation for the first group of file identifiers comprises retrieving, by each respective reduce node of the plurality of reduce nodes, a respective subset of the plurality of files from the file system that correspond to a respective group of file identifiers of the plurality of file identifiers assigned to the respective reduce node.

18. The system of claim 13, wherein the reduce operation for the first group of file identifiers comprises merging, by each respective reduce node of the plurality of reduce nodes, respective data of a respective subset of the plurality of files without performing operations on the respective data of the respective subset of the plurality of files.

* * * * *